Aug. 28, 1962
R. BERGSMA
3,051,814
TEMPERATURE RESPONSIVE SYSTEM
Filed Feb. 27, 1958
2 Sheets-Sheet 1
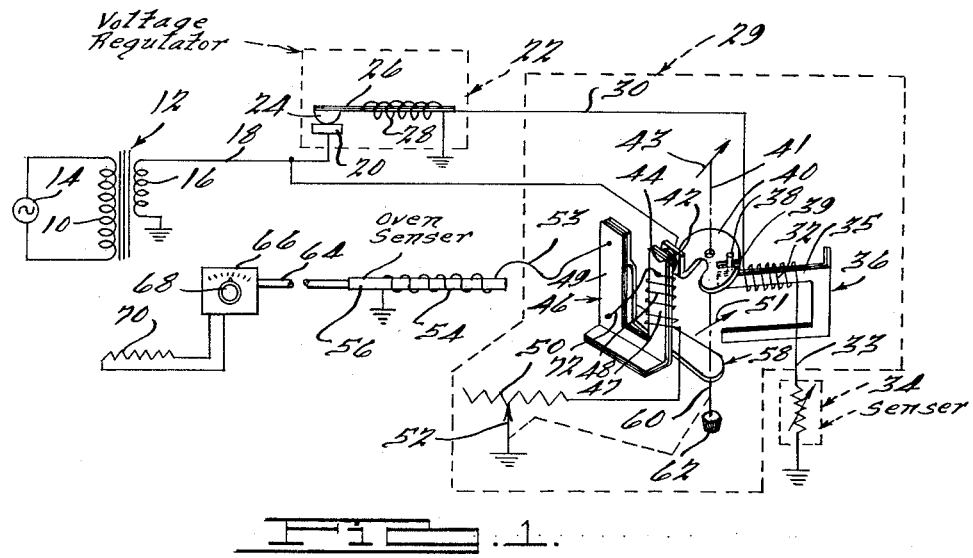
INVENTOR.
Rudolph Bergsma
BY
Harness, Dickey & Pierce
ATTORNEYS.

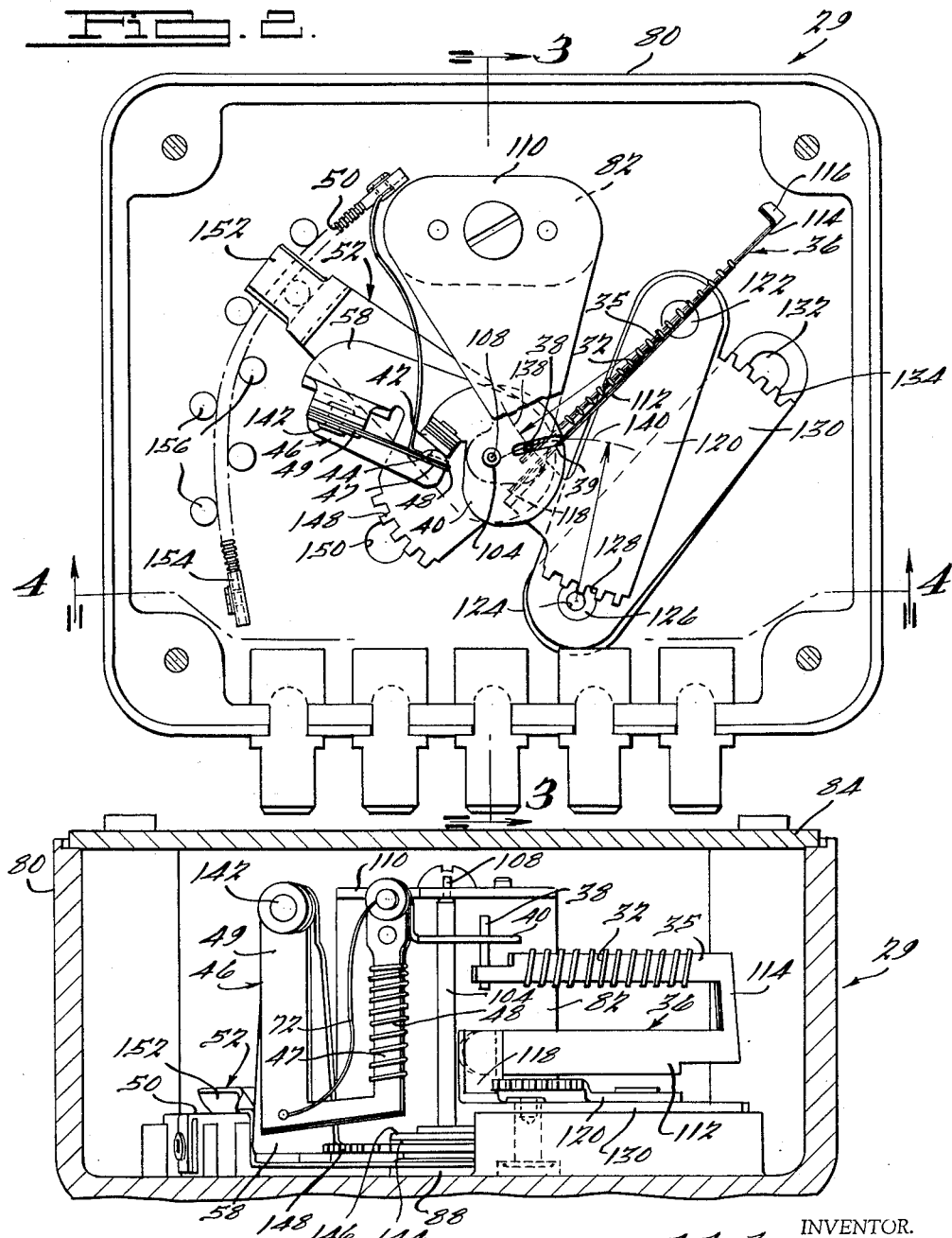

United States Patent Office
3,051,814
Patented Aug. 28, 1962

3,051,814
TEMPERATURE RESPONSIVE SYSTEM
Rudolph Bergsma, Ann Arbor, Mich., assignor to King-Seeley Thermos Co., a corporation of Michigan
Filed Feb. 27, 1958, Ser. No. 717,966
22 Claims. (Cl. 219—20)

This invention relates to electrical controls.

While certain of the principles of the present invention are of general applicability, the inventive concepts have been disclosed in a system for controlling the cooking of an edible mass and particularly for controlling the cooking of meat, fowl, or the like in an oven.

In conventional roasting, the oven is brought to a preselected relatively high temperature and the article is cooked to the desired degree as determined either by inspection or by cooking the mass for a selective period based upon its weight. Based upon a recognition that the internal temperature of the meat, fowl, or the like is an accurate reflection of the degree to which the mass is cooked, it has also come to be common practice to insert a thermometer in the mass and to terminate cooking when the internal temperature of the mass reaches a preselected value, as determined by visual inspection of the thermometer. More recently, this latter method of determining completion of the cooking has been improved by utilizing electrical temperature sensing systems in which a temperature sensing probe is inserted in the meat or fowl and in which an audible or visible alarm is energized when the internal temperature of the article reaches a preselected set value.

One disadvantage of each of these systems is that the article must be removed from the oven immediately the attainment of the selected internal temperature or degree of doneness if the article is not to be overcooked due to the residual heat in the oven. In an improved arrangement, the temperature of the oven is maintained at a constant relatively high value until the temperature of the article being cooked reaches a selected value which is less than its final temperature. At that point, the temperature of the oven is gradually reduced to the point where it approximately coincides with the final temperature of the article at the same time as the article being cooked reaches that final temperature. Thereafter, the oven temperature is maintained at that final value so that no further cooking of the article will occur. With such an arrangement, it has been found that the removal of the food from the oven can be delayed without adversely affecting its quality and without either overcooking or permitting the article to cool. The present invention pertains to apparatus of that nature.

An object of this invention is to improve the accuracy of control and indication of automatic temperature controllers.

Another object of this invention is to change the temperature of an oven from a higher value to a selected lower value with accuracy and to insure that the oven reaches that selected lower temperature at substantially the same time that the interior of a mass being cooked in the oven reaches that temperature.

Another object of this invention is to initiate the cooling of an oven from a higher to a selectable lower value at a time determined by the internal temperature of a mass being cooked in the oven and with regard to the magnitude of the selected lower value.

A further object of this invention is to facilitate calibration of a system for shifting the position of an element as a function of sensed temperature.

Another object of this invention is to permit control of the degree and effect of thermal-current self-heating of a polymetallic element due to the flow of load currents therethrough.

The manner of accomplishing the foregoing objects, and other objects and features of the invention, will be understood from the following detailed description of an embodiment of the invention when read with reference to the accompanying drawings in which:

FIGURE 1 is a schematic representation of a system embodying certain of the principles of the present invention;

FIG. 2 is a front elevational view of a structure embodying certain of the principles of the present invention and being suitable for use as a portion of the equipment of FIG. 1;

FIG. 3 is a sectional view taken substantially along the line 3—3 of FIG. 2; and FIG. 4 is a sectional view taken substantially along the line 4—4 of FIG. 2.

In the schematic representation of FIG. 1, the primary winding 10 of a step-down transformer 12 is connected across a suitable source 14 of alternating voltage so as to induce in the secondary winding 16 a relatively low amplitude control voltage. For convenience of representation, the lower terminal of secondary winding 16 is shown to be connected to ground and the returns from the other elements to that point are represented by the ground symbol. In practice, a chassis or stove return may be employed or a metallic return conductor may be provided.

The upper terminal of secondary winding 16 is connected via conductor 18 to an adjustable fixed contact 20 of a voltage regulator 22. Unit 22 may be of the type disclosed in the United States patent application of Leonard Boddy entitled "Voltage Regulating Device," Serial No. 526,190, filed August 3, 1955. In general, the unit comprises a cantilever-mounted polymetallic element 26 which is desirably formed in the shape of a U to provide ambient temperature compensation. Polymetallic element 26 carries a contact 24 which is mateably with contact 20. A heater winding 28 disposed in heat transfer relationship with polymetallic element 26 has one terminal connected to that element and the other terminal connected to ground. When heater winding 28 is de-energized, contact 24 engages contact 20 so that an alternating current flows from secondary winding 16 through conductor 18, through contacts 20 and 24, through winding 28 and to ground. This current passing through the resistance of winding 28 results in the development of heat which produces an elevation of the temperature of polymetallic element 26. Heating of element 26 causes that element to deflect in a direction to separate contact 24 from contact 20 thereby terminating energization of winding 28. As a result, element 26 cools until contact 24 is again brought into engagement with contact 20, at which time heater winding 28 is re-energized to initiate another such cycle of operation. As is set forth in the above noted Boddy application, the contacts 20 and 24 repetitively open and close with an appropriate ratio of closed time to open time to maintain the wattage developed in and the voltage developed across winding 28 at a value (averaged over a number of the cycles of operation of the device) which will be substantially constant despite fluctuations of the voltage across secondary windings 16. As a result, an alternating voltage having a substantially constant average value is developed between polymetallic element 26 and ground and this voltage is communicated to a controller 29 by means of a conductor 30.

Conductor 30 is connected to one end of a heater winding 32 which is disposed in heat transfer relationship with one leg of a generally U-shaped, ambient-temperature compensated polymetallic element 36 and the other terminal of winding 32 is connected via conductor 33 and through a remote sensor 34 to ground to complete the circuit. Sensor 34 is, in the representative arrangement disclosed, an instrument embodying a resistor having a high temperature coefficient of resistance, it being assumed for present purposes that the resistor (a thermistor) has a high negative temperature coefficient of resistance. Since sensor 34, in the disclosed arrangement, is designed to sense the internal temperature of a roast, a fowl or the like, the resistor is desirably contained within a casing suitable for insertion in such articles and may, for example, take the form illustrated in the United States patent application of Leonard Boddy entitled "Temperature Measuring System," Serial No. 524,549, filed July 26, 1955, now Patent No. 2,925,572.

The magnitude of the current flow through heating means 32 will, of course, be determined by the instant effective resistance of sensor 34. With sensor 34 having an inverse temperature characteristic, the current through heater 32 will increase as the internal temperature of the article being sensed increases. Consequently, resistor 32 will generate increasing amounts of heat with increasing sensed temperatures.

The raising of the temperature of the leg portion 35 of polymetallic element 36 by heat transfer from winding 32 will cause the tip end of leg portion 35 to deflect. In the arrangement illustrated in FIG. 1, increasing temperatures of leg portion 35 will cause the tip to deflect away from the viewer. A pin 38 secured to the tip of leg portion 35 engages a slot 39 in a member 40 which is adapted to rotate about an axis 41, increasing sensed temperatures and increasing deflections of leg portion 35 producing counterclockwise rotation of member 40 as viewed from the upper surface thereof. Since the amount of deflection of leg portion 35 and the amount of rotation of member 40 can be correlated with the sensed temperature, a pointer 43 can be positioned to rotate with member 40 and to cooperate with a scale calibrated in terms of the temperature of the article which is being heated.

An electrical contact 42 is mounted upon an upstanding portion of member 40 and hence is rotated about axis 41 to a position determined by the instant temperature of the article. The position of electrical contact 42 is in turn sensed by means including polymetallic element 46. An electrical contact 44, adapted to mate with contact 42, is mechanically and electrically secured to the tip end of leg portion 47 of element 46. The tip end of leg portion 49 of polymetallic element 46 is secured to a bracket 58 which is adapted to be rotated about an axis 60 in response to rotation of a manually rotatable knob 62 which also rotates a settable pointer 51.

A heating winding 48 is disposed in heat transfer relationship with leg portion 47 of polymetallic element 46 with one end of that winding being electrically connected to leg portion 47 and hence to electrical contact 44 and with the other end of that winding being connected to a variable resistance element 50 having a movable brush or wiper 52 which is connected to ground.

With bracket 58 having been rotated by knob 62 to a position selected in accordance with the desired final temperature of the article being cooked (as indicated by pointer 51) and with that article being relatively cool, contacts 42 and 44 will be spaced from one another. As the temperature of the article rises, contact 42 is moved toward contact 44 until engagement is first made. The temperature of the article at which this will occur will vary with variations in the set positions of knob 62, pointer 51 and polymetallic element 46. The difference between that temperature and the set final temperature of the article is here termed the "anticipation," and the time required for the internal temperature of the article to change from the temperature of first engagement of contacts 42–44 to the final set temperature is the period during which the oven temperature is reduced from its originally maintained value to the set final value.

The amount of anticipation which will occur at any given position of knob 62 can be determined by the relationships between the parts. It has been found to be advantageous to arrange the elements so that the amount of anticipation (in degrees of change of article temperature) will differ with different settings of knob 62, with greater anticipation being provided at low set final temperatures than at high set final temperatures although it will be understood that the principles of the invention are not restricted to such an arrangement. In a constructed unit, as an example, the physical relationships were selected in the light of the resistance-versus-temperature curve of the thermistor sensor 34 so that with knob 62 and element 46 positioned to produce a 140° F. final meat temperature, the first engagement of contact 42 with contact 44 occurred at 90° F., while at the 185° F. setting of knob 62 and element 46, the first contact closure occurred at 160° F. Therefore, the anticipation at a 140° F. setting was 50° F. whereas the anticipation at a 185° F. setting was but 25° F.

From the foregoing, it will be apparent that the amount of anticipation can be varied at any given setting of knob 62 by adjusting the angular position of bracket 58 relative to knob 62 and pointer 51, but that this change will not affect the ratio of the anticipation at one setting to the anticipation at another setting.

When contact 42 engages contact 44, current will flow from secondary winding 16 of transformer 12, through conductor 18, electrical contact 42, electrical contact 44, through a small part of leg portion 47 of polymetallic element 46, through heater winding 48, through a selected portion of resistor 50 and to ground through the movable element 52. This current will produce heating of winding 48 which will result in elevation of the temperature of leg portion 47 to cause contact 44 to be deflected in a direction away from contact 42. Upon the separation of the contacts, heater winding 48 will be de-energized, permitting leg portion 47 to cool and to bring contact 44 again into engagement with contact 42 to initiate the next cycle of such operation. As a result, contacts 44 and 42 will tend to remain in a condition of incipient opening and closing, with the average current flowing through winding 48 being just sufficient to produce this result. The ratio of closed time to open time of contacts 42 and 44 to produce the requisite current through winding 48 will, of course, vary with the setting of the rheostat including resistor 50, the higher the value of the effective resistance in series with winding 48, the longer each closure of contacts 42 and 44. It will be recognized that polymetallic element 46 and electrical contact 44 will offer substantially no mechanical resistance to further rotation of member 44 and to further movement of electrical contact 42 since the mechanical power developed as a result of the current flow through winding 48 will continually maintain electrical contact 44 in but incipient engagement with contact 42, contact 44 moving with contact 42 and effectively continually sensing the instant physical position of electrical contact 42.

Two other factors also have an effect upon the magnitude of the current through winding 48 and hence upon the voltage between polymetallic element 46 and ground. One of these factors is the position of electrical contact 42. The more contact 42 is advanced in a counterclockwise direction (as viewed from the upper surface of member 40 in FIG. 1) the more the energy which is required to maintain contact 44 in incipient contacting relationship with contact 42 and consequently the greater the magnitude of the current through winding 48 and the greater the average voltage between element 46 and ground. The other factor is the magnitude of the voltage across secondary winding 16. This factor is insignificant since the polymetallic element 46 tends to operate in a manner similar to voltage regulator 22 to maintain the voltage between itself and ground at a value which is effectively independent of supply voltage variations.

The voltage between polymetallic element 46 and ground is applied via conductor 53 across an electrically energized load device 54 which is illustrated to be an electric resistance-type heater disposed in heat transfer relationship with an oven sensor 56. For purposes of illustration, it is assumed that sensor 56 is a conventional form of oven sensor which contains a liquid which expands when heated. Senser 56 is connected to an oven-temperature controller 66 by means of a fluid conduit 64 so that the expansion of the fluid resulting from heating of the sensor 56 can produce deflection of a diaphragm in controller 66 to change the position of a constituent element of that controller as a function of sensed temperature. Controller 66 includes a manually settable knob 68 by means of which the desired oven temperature can be selected. Controller 66 controls the application of energy (assuming an electric oven) from a suitable source of alternating current to the element or elements of the oven symbolically represented by resistor 70. The heat from element 70, of course, heats the oven, as sensed by the oven sensor 56 and therefore heats the article being cooked, the temperature of which is sensed by sensor 34.

To utilize the system of FIG. 1, the knob 68 is set to a standard selected temperature, such as 325° F. and, in the absence of energization of heater 54, controller 66 will operate in response to oven sensor 56 to control element 70 to bring the oven to that selected temperature and to thereafter maintain the oven substantially at that temperature. If, however, heater 54 is energized, the sensor 56 is subjected not only to the heat derived from the oven but also to the heat derived from heater 54, as a result of which it responds just as if the oven temperature had risen to a value above the set oven temperature. As a result, controller 66 reduces the energization of element 70. With a fixed amount of current through resistance heater 54, the actual oven temperature will be reduced by a fixed amount, even though the setting of knob 68 is not changed. Consequently, the temperature of the oven can be reduced from its set value to a lower value equal to the desired final temperature of the article being cooked by supplying an appropriate amount of electrical energy to the heater element 54, and the rate of change of oven temperature between the set higher value and the final lower value can, but need not, be controlled by varying the rate of change of applied energy to the heater element 54 between zero energization and that level of energization which is required to reduce the oven temperature to the desired final article temperature. Control will occur if the rate of change of the energy supplied to heater 54, with respect to time, from the instant of first engagement of contacts 42—44 to the instant that the interior of the mass reaches the set completion temperature is less than the free cooling rate of the oven from the initial higher temperature to the set completion temperature. However, if the equipment is arranged to insure that the oven and the mass reach the set completion temperature at the same time, the cooking time will be minimized if the oven is cooled as rapidly as possible, so there are practical advantages to minimizing the control during this period so as to minimize the energization of heater 70 during the cooling period. The rate of change of energization of winding 54 with respect to changes of internal meat temperature should be selected, therefore, in the light of the free cooling rate of the ovens with which the equipment is to be associated, and substantial differences in the amount of insulation present in different ovens may warrant corresponding modification of the control system.

In a constructed embodiment of the disclosed system, the parts were arranged so that the angular rotation of the member 40 from the point of first engagement of contacts 42—44 to the set completion temperature was substantially constant (19°–25° nominal) over the range of set completion temperatures. Since the amount of anticipation was purposely varied with changes in the set completion temperature, it will be appreciated that the relationship between the sensed temperature of the mass and the position of contact 42 was curvilinear. Thus, in the previously presented examples, a fifty degree change of sensed temperature (90° F. to 140° F.) of the mass was required at one completion temperature setting (140° F.) to produce the same angular movement of contact 42 as that produced by but a twenty-five degree change of sensed temperature (160° F. to 185° F.) at a higher completion temperature setting (185° F.).

With such an arrangement (which is but representative of a variety of arrangements within the scope of the invention) it will be apparent that in the absence of resistor 50 or other such means, the wattage supplied to heater 54 at the completion temperature would be effectively constant at all completion-temperature settings, which, obviously, would result in the final oven temperature being effectively constant at all settings. Even with other sensed-temperature versus contact 42 position relationships, in the absence of means such as the rheostat including resistor 50 it is exceedingly difficult to obtain the proper degree of energization of heater 54 at the completion temperature to insure that the oven temperature will be brought to the proper completion temperature at all settings, and, for similar reasons, it is difficult to obtain coincidence between the positions of the indicating and settable pointers at each of the selectable completion temperatures.

The use of the variable resistor 50 permits solution of both of these difficulties. In the disclosed arrangement the movable element 52 of the variable resistor is mechanically coupled to the knob 62 so that the amount of resistance which is inserted in series with the winding 48, in the illustrated arrangement, is varied with changes of the setting of knob 62. To reduce the temperature of the oevn to a relatively low completion value requires a greater application of heat to sensor 56 by heater 54 than it does to reduce the oven temperature to a higher value. Consequently in the illustrated system, the effective value of resistance 50 is reduced as the set completion temperature is raised. The greater the value of resistance 50, the longer the contacts 42—44 must be closed during each cycle of operation of polymetallic element 46 in order to develop sufficient average wattage in heater 48 to separate the contacts, and the greater the average voltage applied across heater 54, while with lower values of resistance of element 50, a greater portion of the voltage of secondary winding 16 appears across winding 48 during each closure of the contacts 42—44 so less closure time is required during each cycle to produce the same average wattage in heater 48 and accordingly a lower average voltage is developed across heater 54.

The effective value of resistor to produce proper operation at any given completion-temperature setting will, of course, be determined by factors including the resistance of heater 54, the degree of heat transfer between heater 54 and sensor 56, and the characteristics of controller 66. In one constructed arrangement, resistance 50 was varied to produce an average voltage across heater 54 of 8.25 volts when the internal temperature of the mass reaches a set completion value of 140° F. in order to supply enough auxiliary heat to sensor 56 to cause the oven temperature to also be at 140° F., developed across heater 54 to obtain coincidence of the mass and oven temperatures at 185° F.

In the disclosed unit, the position of movable element 52 is varied linearly with changes of the setting of knob 62. Any desired relationship between the completion-temperature voltage across heater 54 and the setting of the knob 62 can be achieved by appropriate tapering of the resistor 50 or, less simply, by driving the movable element 52 from the knob 62 through a cam.

It will be observed that a high conductivity conductor 72, such as a copper wire, is electrically connected to the contact-carrying end of leg portion 47 of polymetallic element 46, as well as to the non-anchored end of polymetallic leg portion 49. In the absence of such a connection, the load currents through the contacts 42 and 44 and through the resistance heater 54 would flow substantially the entire elength of the polymetallic element 46. Since laminated bimetallic and trimetallic sheets have an effective value of resistance, this current flow would result in thermal-current or self-heating. However, assuming uniform cross-sectional areas and lengths of the two leg portions 47 and 49 for purposes of discussion, the two leg portions would have substantially equal values of resistance, those two leg portions would be effectively equally heated and the ambient-temperature compensating characteristics of the unit would cause this thermal current heating to produce no substantial effect upon the position of contact 44.

Thermal current heating of the polymetallic element can be employed to advantage if desired, in the illustrated construction. When electrical contact 42 first engages contact 44, the force of engagement is very light, and but little heat is required from heater winding 48 to produce separation of the contacts. As a result, the amount of energy supplied to heater winding 54 at this first engagement may be very small. If it is desired to insure that the first energy pulse (and each subsequent energy pulse) be of at least a preselected minimum duration, polymetallic element 46 may be imbued with a "lock-in" characteristic by connecting conductor 72 as shown in FIG. 1 of the drawings. This establishes a low-resistance shunt in parallel with leg portion 47 so that the amount of load current which flows through leg portion 49 is appreciably greater than that which flows through leg portion 47. Consequently there is a differential thermal-current or self-heating effect which causes leg portion 49 to deflect in a direction to tend to press contact 44 into engagement with contact 42. This "lock-in" effect may be, for example, sufficient to insure that upon initial closure, the contacts 42—44 will remain closed for at least, say, 4% of the duration of the next open period. It will be observed that the use of a shunt of this nature is of general applicability and by connecting such a shunt from the lower end of leg portion 47 to the upper end of leg portion 49, a "lock-out" effect may be established. In both cases, the magnitude of the effect can be controlled both by selection of the conductivity of the shunting conductor and by the location of the point along the leg portion at which the end of the conductor is attached.

It is also contemplated that the variable resistance element may be inserted in conductor 53 rather than in its shown location. In both cases, the average power supplied to heater winding 54 will vary with the settings of knob 62. In the illustrated arrangement, the voltage applied across winding 54 during any period of closure of contacts 42 and 44 (assuming constant line voltage) will be constant and independent of the setting of knob 62, but the time of closure of contacts 42 and 44 will vary in accordance with the setting of the rheostat. In the alternatively contemplated arrangement, the duration of the closure of contacts 42 and 44 will not vary with changes of the position of knob 62, but the voltage actually appearing across the winding 54 will vary with those settings since a variable potential drop will occur across the variable resistor. It is also contemplated that in lieu of exerting control upon the sensor 56, the modifying action may be exerted directly upon the controller 66. For example, in a purely thermostatic type of oven controller the output electrical energy from the unit 29 may be employed to control the position of a relatively fixed contact which cooperates with an electrical contact controlled by the sensor 56, while in a pulsing type controller (in which the element 70 is energized and de-energized at a rate which is rapid relative to the changes of temperature sensed by sensor 56), the average position of a cyclically moving contact may be varied by the output voltage from unit 29 or equivalent effects may otherwise be obtained. It will be recognized that regardless whether the oven controller is of the thermostatic or of the pulsing type and whether the control is exercised directly upon the controller or through the sensor, the oven temperature will tend to vary in small cycles due to the action of that controller. Consequently, it will be understood that the oven temperature during its period of gradual reduction will actually follow a notching or undulating course.

It will also be appreciated that the principles of the invention are applicable to other types of oven-temperature controllers such, for example, as those having a bimetal sensor in the oven controlling a pair of electrical contacts in which case the heater 54 could be associated with that bimetallic sensor.

In the structure illustrated in FIGS. 2, 3 and 4, a hollow housing 80 is provided with an upstanding boss 82. The back of the housing 80 is closed by means of a cover plate 84. As may best be seen in FIG. 3 of the drawings, a bearing assembly 86 is rotatably supported in an aperture in the forward wall of housing 80. Bearing assembly 86 is provided with a flange 88 which bears against the inner face of that forward wall, while a spring washer 90 is trapped between the outer face of that wall and the rear face of the settable pointer 51 which is staked or otherwise secured to the forward end of the bearing assembly 86. The settable pointer 51 is further provided with a depending portion having a forwardly offset projection 92 which engages a slot in an arm 94. Arm 94 is secured to a shaft 96 which is rotatably mounted in an aperture in a bracket 98 secured to the forward face of the housing 80. To resiliently hold the shaft 96 in position, a spring washer 100 is trapped between the outer face of the bracket 98 and the shoulder on the shaft 96. The manually settable knob 62 is secured upon the shaft 96. The longitudinal axis of the shaft 96 and of the bearing assembly 86 defines the axis 60 noted in the discussion of FIG. 1.

The bearing assembly 86 is provided with a central recess 102 in its rear face to define a centrally apertured bearing seat for a staff 104 which is the counterpart of the axis 41 in FIG. 1 of the drawings. A reduced diameter projection 106 of the staff 104 projects through the aperture in the recess 102 and carries the indicator pointer 43. By virtue of this construction the settable pointer 51 and the indicator pointer 43 rotate about a common axis.

A reduced diameter projection 108 at the rear end of the staff 104 engages an aperture in a bridge 110 which is rigidly supported upon the boss 82. The member or disk 40 is rigidly secured to the staff 104 so that these two elements will rotate together. In the illustrated arrangement, member 40 is provided with a generally radial slot 39 (FIG. 2) for accepting the pin 38 which is rigidly secured to the free end of leg portion 35 of bimetallic or trimetallic element 36. Leg portions 35 and 112 of polymetallic element 36, disposed in spaced parallelism with one another, are interjoined by a crosspiece 114 having an upstanding flange 116 for rigidifying that crosspiece against any effective deflection as the result of heating.

The tip of leg portion 112 is secured to the upstanding leg 118 of an adjusting bracket 120. Bracket 120 can be rotated about the axis of a rivet 122 by inserting a key in a recess 124 formed in rivet 126 and rotating the key, the key being provided with gear teeth engageable with teeth 128 formed in the bracket 120 at a point remote from rivet 122.

Rivet 122 rotatably secures bracket 120 to a bracket 130 which is in turn pivotally secured to a portion of the housing 80 by the rivet 126. Bracket 130 may be rotated about the axis of rivet 126 by inserting a key in a recess 132 in the housing 80, that key being provided with teeth to engage the teeth 134 formed on bracket 130 at a point remote from the rivet 126.

When leg portion 35 of polymetallic element 36 is heated, it moves pin 38 in a generally arcuate path. The angle of the slot 39, the location of the staff 104 (defining the rotational axis 41 in FIG. 1 of the member 40) and the location of the axis of the polymetallic element 36 are selected in the light of one another to produce a desired set of characteristics including the amount of anticipation at each completion-temperature setting, the rate of change of oven temperature with respect to change of the internal temperature of the mass during the anticipation period for varying completion-temperature settings, and the degree and nature of expansion or contraction (i.e., non-linearity) of the scale with which the indicator and settable pointers cooperate.

In the disclosed arrangement, the amount of anticipation is greater at low completion temperatures than at higher completion temperatures, and the scale is expanded at the higher-temperature end, that is, a given angular movement of the indicator pointer at higher sensed temperatures reflects a lesser change of the sensed temperature than at lower sensed temperatures. This possesses the merit that the major indicator-pointer movement is in the control range, with the scale below the control range being compressed.

As an example based on the noted constructed unit, the staff 104, the member 40 and its contact 42, and the indicator pointer 43 rotate through an angle of but a few degrees as the internal temperature of the mass rises to 90° F., and through an additional angle (in accordance with the previous example) of 19°–25° as the sensed temperature increases to 140° F. Similarly, those elements rotate through an angle of 19°–25° as the sensed temperature changes from 160° F. to 185° F.

If the polymetallic element 36 is bent at its anchor a distance in a counterclockwise direction, the degree of the compression at the lower end and expansion at the other end will be increased. If the element 36 is rotated a substantial distance clockwise, the scale will be compressed at the upper end and expanded at the lower. At an intermediate angle, the scale is expanded in a center range and compressed both below and above that range.

To calibrate the unit, bracket 120 is rotated about pivot 122 relative to bracket 130 to move the pin 38 along a line 138 so as to rotate the member 40 until the indicator pointer 43 is at a preselected calibrating position with respect to the scale. This moves the member 40 to a position wherein the pin 38 and the rivet 126 are on the perpendicular bisector of the slot. The bracket 130 is then rotated about rivet 126 (carrying bracket 120 therewith) to calibrate the rate of change of angular position of the member 40 with unit deflection of the polymetallic element 36. This rotation results in movement of pin 38 along a line 140, that is, along the slot 39 so as to adjust the distance between the pin 38 and the axis of rotation of the member 40, without producing rotation of member 40. Consequently, the two adjustments are independent.

The end of the leg portion 49 of the controller element 46 is secured by a rivet 142 to the adjusting bracket 58 which is mounted upon the bearing assembly 86 as may best be seen in FIG. 3 of the drawings. The forward face of the bracket 58 engages a shoulder on the bearing assembly 86 and the rear face of that bracket is engaged by an annular member 144 which also frictionally engages the face of a staking washer 146 which is firmly secured to the bearing assembly 86. By virtue of this construction, bracket 58 can be forced to rotate relative to the bearing assembly 86 for purposes of calibration but will not rotate relative to that bearing assembly during use. To produce this rotation, bracket 58 is also provided with a toothed portion 148 (FIGS. 2 and 4) which can be engaged by the teeth on a key which is inserted into a recess 150 (FIG. 2) in a portion of the housing 80.

The wiper or brush element 52 which, with the resistor 50, forms the variable resistor or rheostat assembly, is staked or otherwise secured against rotation with respect to bearing assembly 86 as may best be seen in FIG. 3 of the drawings. Element 52 includes a contacting portion 152 slidably engageable with the resistance wire 50 which is wound upon a former or card 154. As previously noted, this former may be of any suitable shape and may differ in cross section over its length in order to permit any desired modification of the rate of change of resistance with changes in the position of the settable pointer 51. To retain the former 154 in position upon the housing 80, a plurality of projections 156 are formed upon the housing and the former 154 is stressed to lie therebetween.

It will be observed that when the position of the bracket 58 is shifted relative to the bearing assembly 86 (FIG. 3) the position of the electrical contact 44 is changed with respect both to the location of the settable pointer 51 and to the position of wiper 52. If necessary for calibration, the point of engagement between the wiper 52 and the resistance wire 50 for any given position of the settable pointer 51 may be modified by shifting the former 154 longitudinally of itself and with respect to the projections 156. It will be recognized that these adjustments, made at a calibrating point, effectively change the sensitivity of the polymetallic element 46 over the entire range of its operations.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system for controlling an electrically energized element, a first electrical contact, temperature sensing means, means including said temperature sensing means for varying the position of said first electrical contact, a second electrical contact matable with said first electrical contact, manually settable means for varying the relationship between said electrical contacts, means including said electrical contacts for supplying the electrically energized element with energy at a rate which varies with changes of the position of said first electrical contact, and variable resistance means controlled by said manually settable means for varying said rate.

2. In a system for controlling an electrically energized element, a first electrical contact, temperature sensing means, means including said temperature sensing means for varying the position of said first electrical contact, a second electrical contact matable with said first electrical contact, manually settable means for varying the relationship between said electrical contacts, means including said electrical contacts for supplying the electrically energized element with energy at a rate which varies with changes of the position of said first electrical contact, and additional means controlled by said manually settable means for varying said rate comprising a variable resistor connected in series with said electrical contacts and having a movable element movable by said manually settable means.

3. In a system for controlling an electrically energized element, a first electrical contact, temperature sensing means, means including said temperature sensing means for varying the position of said first electrical contact, a second electrical contact matable with said first electrical contact, manually settable means for varying the relationship between said electrical contacts, a polymetallic element, means including said polymetallic element for controlling the position of said second electrical contact, electrical resistance type heating means for said polymetallic element, means including said electrical contacts for energizing said heating means, said polymetallic element deflecting in response to heat from said heating means to move said second electrical contact in a direction to separate said electrical contacts and to terminate energization of said heating means whereby said electrical contacts are repetitively closed and opened, circuit means including said electrical contacts for energizing the electrically energized element, and variable resistance means controlled by said manually settable means for varying the amount of electrical energy which is supplied to said element.

4. In a system for controlling an electrically energized element, a first electrical contact, temperature sensing means, means including said temperature sensing means for varying the position of said first electrical contact, a second electrical contact matable with said first electrical contact, manually settable means for varying the relationship between said electrical contacts, a polymetallic element, means including said polymetallic element for controlling the position of said second electrical contact, electrical resistance type heating means for said polymetallic element, means including said electrical contacts for energizing said heating means, said polymetallic element deflecting in response to heat from said heating means to move said second electrical contact in a direction to separate said electrical contacts and to terminate energization of said heating means whereby said electrical contacts are repetitively closed and opened, circuit means including said electrical contacts for energizing the electrically energized element, a variable resistor connected in series with said electrical contacts, and means including said manually settable means for varying said resistor.

5. In a system for controlling an electrically energized element, a first electrical contact, temperature sensing means, means including said temperature sensing means for varying the position of said first electrical contact, a second electrical contact matable with said first electrical contact, manually settable means for varying the relationship between said electrical contacts, a polymetallic element, means including said polymetallic element for controlling the position of said second electrical contact, electrical resistance type heating means for said polymetallic element, means including said electrical contacts for energizing said heating means, said polymetallic element deflecting in response to heat from said heating means to move said second electrical contact in a direction to separate said electrical contacts and to terminate energization of said heating means whereby said electrical contacts are repetitively closed and opened, circuit means including said electrical contacts for energizing the electrically energized element, a variable resistor connected in series with said electrical contacts, and means including said manually settable means for varying said resistor and for concurrently shifting the position of said electrical contacts.

6. In a system for controlling an electrically energized element, a first electrical contact, temperataure sensing means, means including said temperature sensing means for varying the position of said first electrical contact, a second electrical contact matable with said first electrical contact, manually settable means for varying the relationship between said electrical contacts, a polymetallic element, means including said polymetallic element for controlling the position of said second electrical contact, electrical resistance type heating means for said polymetallic element, means including said electrical contacts for energizing said heating means, said polymetallic element deflecting in response to heat from said heating means to move said second electrical contact in a direction to separate said electrical contacts and to terminate energization of said heating means whereby said electrical contacts are repetitively closed and opened, circuit means including said electrical contacts for energizing the electrically energized element, a variable resistor connected in series with said electrical contacts and in series with said heating means, and means including said manually settable means for varying said resistor.

7. In a control system for association with an oven adapted to cook an edible mass and having a heating element and a controller including an oven-temperature sensor for controlling the heating element and adapted to maintain the oven at a preselected temperature, the combination of control means for effecting a gradual reduction of said preselected temperature including sensing means for sensing the temperature of the mass, settable means for setting the completion temperature of the mass, means including said settable means for initiating said gradual reduction of said preselected temperature when said temperature of the mass reaches a value which changes with changes of said completion temperature, and variable resistance means controlled by said settable means for adjusting the controller to reduce the oven temperature to said completion temperature.

8. The combination of claim 7 in which said settable means controls a settable pointer cooperating with a scale to indicate the set completion temperature, in which said sensing means controls an indicating pointer cooperating with said scale, and in which said mass and the oven reach the completion temperature as said pointers reach coincidence.

9. In a system for controlling a load device, a setting pointer, a temperature sensor, a first polymetallic element, heating means for said element controlled by said sensor for varying the position of said element, an indicator pointer variably positionable by said element, a first electrical contact variably positionable by said element, a second polymetallic element, a second electrical contact, means including said second polymetallic element for controlling the position of said second electrical contact, heater means for said second polymetallic element controlled by said electrical contacts, circuit means including said electrical contacts for controlling the load device, a bracket supporting said second polymetallic element, a variable resistor connected in circuit with said electrical contacts and having a movable element, and manually operable means for concurrently moving said bracket, said setting pointer and said movable element of said resistor.

10. In a control system, a pair of matable electrical contacts, a U-shaped polymetallic element for controlling the relationship between said contacts, said polymetallic element having a pair of electrically and mechanically interconnected parallel leg portions, a load device, circuit means for connecting a source of energy, said load device, said electrical contacts and first and second portions of said polymetallic element in circuit, the flow of current through said first and second portions of said polymetallic element tending to produce heating of said first and second portions, and electrical conductor means connected in parallel with said second portion of said polymetallic element to reduce the current through said second portion.

11. In a control system, a pair of matable electrical contacts, a U-shaped polymetallic element for controlling the relationship between said contacts, said polymetallic element having a pair of electrically and mechanically interconnected parallel leg portions, a load device, circuit means for connecting a source of energy, said load device, said electrical contacts and said pair of leg portions of said polymetallic element in circuit, the flow of current through said pair of leg portions of said polymetallic element producing heating thereof, and an electrical conductor connected in parallel in said circuit with only a portion of said polymetalic element to reduce the current through said portion.

12. The combination of claim 11 in which said conductor is connected in circuit with one of said leg portions so that the current in said circuit produces differential heating of said leg portions.

13. The combination of claim 12 in which said conductor is connected in parallel with the one of said leg portions which tends to produce separation of said contacts when heated.

14. In a control system, current modulating condition sensing means responsive to a changeable condition to progressively vary the electrical current in a circuit in accordance with changes of the changeable condition, a rotatable member rotatable about a first axis and having a slot therein, a pin engaging the slot in said rotatable member, a rotatable support member, electro-responsive driving means supported by said support member and movable relative to and independently of any movement of said support member and connected in said circuit and progressively responsive to variations of said electrical current for moving said pin to progressively rotate said rotatable member in accordance with the variations of said electrical current, manually actuatable adjusting means including said support member for rotating said pin about a second axis remote from said first axis and remote from said pin, and manually actuatable adjusting means including said supporting member for rotating said pin about a still different axis remote from said pin.

15. In a control system, current modulating condition sensing means responsive to a changeable condition to progressively vary the electrical current in a circuit in accordance with changes of the changeable condition, a rotatable member rotatable about a first axis and having a slot therein, a pin engaging the slot in said rotatable member, a rotatable support member, electro-responsive driving means supported by said support member and movable relative to and independently of any movement of said support member and connected in said circuit and progressively responsive to variations of said electrical current for rotating said pin about a second axis remote from said first axis to progressively rotate said rotatable member in accordance with the variations of said electrical current, manually actuable adjusting means including said support member for rotating said pin about a third axis remote from both said first and said second axes and remote from said pin, and manually actuatable adjusting means including said supporting member for rotating said pin about a still different axis remote from said pin.

16. In a control system, current modulating condition sensing means responsive to a changeable condition to progressively vary the electrical current in a circuit in accordance with changes of the changeable condition, a rotatable member rotatable about an axis and having a slot therein, a pin engaging the slot in said rotatable member, a rotatable support member, electro-responsive driving means supported by said support member and movable relative to and independently of any movement of said support member and connected in said circuit and progressively responsive to variations of said electrical current for moving said pin to progressively rotate said rotatable member in accordance with the variations of said electrical current, manually actuatable means for moving said pin in one direction for adjusting the distance between said pin and said axis without producing rotation of said rotatable member, and additional manually actuatable adjusting means for moving said pin in a direction at an angle to said one direction.

17. In a system for controlling a load device, a setting pointer, a temperature sensor, a first polymetallic element, heating means controlled by said sensor and disposed in heat transfer relation with said element for varying the position of said element, a rotatable member rotatable about an axis and having a slot therein, a pin engaging the slot in said rotatable member and driven by said first polymetallic element, said first polymetallic element moving said pin in one direction relative to said axis, means including support means for said first polymetallic element for moving said pin in a different direction from said one direction for adjusting the distance between said pin and said axis without producing rotation of said rotatable member, means including said support means for said first polymetallic element for moving said pin in a direction at an angle to said different direction and in substantially the same direction as said one direction, an indicator pointer variably positionable by said rotatable member, a first electrical contact variably positionable by said rotatable member, a second polymetallic element, a second electrical contact controlled in position by said second polymetallic element, heater means in heat transfer relation with said second polymetallic element and controlled by said electrical contacts, circuit means including said electrical contacts for controlling the load device, a bracket supporting said second polymetallic element, a variable resistor connected in circuit with said electrical contacts and having a movable element, and manually operable means for concurrently moving said bracket, said setting pointer and said movable element of said resistor.

18. In a system for controlling an electrically energized element, a rotatable member rotatable about a first axis and having a slot therein, a pin engaging the slot in said rotatable member, a first electrical contact mounted on said rotatable member, temperature sensing means, means including said temperature sensing means for moving said pin to rotate said member for varying the position of said first electrical contact, adjusting means including support means for said driving means for rotating said pin about a second axis remote from said first axis, means including said supporting means for rotating said pin about a still different axis, a second electrical contact matable with said first electrical contact, manually settable means for varying the relationship between said electrical contacts, means including said electrical contacts for supplying the electrically energized element with energy at a rate which varies with changes of the position of said first electrical contact, and additional means controlled by said manually settable means for varying said rate.

19. In a system for controlling the energization of an electrically energized element from a source of electrical energy, a first electrical contact, temperature sensing means, means including said temperature sensing means for varying the position of said first electrical contact in accordance with the temperature sensed by said temperature sensing means, a second electrical contact matable with said first electrical contact, circuit means for connecting said electrical contacts in electrical circuit with the source of electrical energy and with the electrical energized element for causing said electrical contacts to control the flow of current in said electrical circuit and to establish such current flow upon engaging one another, and means responsive to said flow of current in said electrical circuit resulting from the movement of said first electrical contact into engagement with said second electrical contact for moving said second electrical contact toward said first electrical contact for pressing the contacts together comprising polymetallic spring means controlling the position of said second electrical contact and connected in said electrical circuit and deflectable in response to the thermal-current heating thereof by the current in said electrical circuit in a direction to tend to move said second electrical contact toward said first electrical contact.

20. The combination of claim 19 in which said polymetallic spring means is one leg portion of a polymetallic element having two leg portions the heating of one of which tends to produce movement of said second electrical contact in a direction opposite to the direction of movement of said second electrical contact produced by the heating of the other one of said leg portions, and in which the heating of said one leg portion by said current in said electrical circuit is greater than the heating of the other one of said leg portions by said current in said electrical circuit.

21. The combination of claim 20 in which heating of said other leg portion by said current in said electrical circuit is reduced relative to heating of said one leg portion by connecting a conductive element in parallel with said other leg portion in said electrical circuit.

22. The combination of claim 16 in which said driving member moves said pin in a preselected direction in relation to said first axis and in which said additional means moves said pin in substantially the same direction as said selected direction.

References Cited in the file of this patent

UNITED STATES PATENTS

| | | |
|---|---|---|
| 2,103,513 | Campbell | Dec. 28, 1937 |
| 2,205,637 | Smulski | June 25, 1940 |
| 2,275,237 | Smulski | Mar. 3, 1942 |
| 2,479,319 | Crowley et al. | Aug. 16, 1949 |
| 2,607,867 | Platz | Aug. 19, 1952 |
| 2,611,850 | Walton | Sept. 23, 1952 |
| 2,680,970 | Durkee | June 15, 1954 |
| 2,811,871 | Gaubatz | Nov. 5, 1957 |
| 2,817,241 | Chandler | Dec. 24, 1957 |
| 2,820,130 | Dadson | Jan. 14, 1958 |
| 2,846,531 | Baker | Aug. 5, 1958 |
| 2,846,556 | Whinery | Aug. 5, 1958 |
| 2,883,506 | Jordan | Apr. 21, 1959 |
| 2,883,507 | Lewis et al. | Apr. 21, 1959 |
| 2,894,105 | Long et al. | July 7, 1959 |
| 2,910,569 | Boddy | Oct. 27, 1959 |
| 2,914,644 | Holtkamp | Nov. 24, 1959 |